(12) United States Patent
Ma et al.

(10) Patent No.: US 6,503,621 B1
(45) Date of Patent: Jan. 7, 2003

(54) PRESSURE SENSITIVE ADHESIVES AND ARTICLES INCLUDING RADIAL BLOCK AND ACRYLIC POLYMERS

(75) Inventors: Jingjing Ma, Woodbury, MN (US); Jeff J. Cernohous, Plymouth, MN (US); Paul Sedgwick, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/499,991

(22) Filed: Feb. 8, 2000

(51) Int. Cl.$^7$ .............................. B32B 7/12; C08L 53/00
(52) U.S. Cl. ................... 428/355 BL; 428/355 AC; 524/272; 524/505; 525/95
(58) Field of Search ............................... 524/505, 272; 525/95; 428/355 BL, 355 AC

(56) References Cited

U.S. PATENT DOCUMENTS

| | | |
|---|---|---|
| RE24,906 E | 12/1960 | Ulrich |
| 3,660,323 A | 5/1972 | Raguse |
| 3,932,328 A | 1/1976 | Korpman |
| 4,102,835 A | 7/1978 | Freeman et al. |
| 4,126,464 A | 11/1978 | Dann |
| 4,136,071 A | 1/1979 | Korpman |
| 4,181,635 A | 1/1980 | Takamatsu et al. |
| 4,181,752 A | 1/1980 | Martens et al. |
| 4,243,500 A | 1/1981 | Glennon |
| 4,311,759 A | 1/1982 | Glennon |
| 4,379,201 A | 4/1983 | Heilmann et al. |
| 4,554,324 A | 11/1985 | Husman et al. |
| 4,619,979 A | 10/1986 | Kotnour et al. |
| 4,693,776 A | 9/1987 | Krampe et al. |
| 4,737,559 A | 4/1988 | Kellen et al. |
| 4,780,367 A | 10/1988 | Lau et al. |
| 4,833,179 A | 5/1989 | Young et al. |
| 4,843,134 A | 6/1989 | Kotnour et al. |
| 5,143,972 A | 9/1992 | Groves |
| 5,229,206 A | 7/1993 | Groves |
| 5,296,547 A | 3/1994 | Nestegard et al. |
| 5,382,451 A | 1/1995 | Johnson et al. |
| 5,393,787 A | 2/1995 | Nestegard et al. |
| 5,500,293 A | 3/1996 | Lau et al. |
| 5,506,279 A | 4/1996 | Babu et al. |
| 5,610,238 A | 3/1997 | Himes et al. |
| 5,637,646 A | 6/1997 | Ellis |
| 5,686,535 A | * 11/1997 | Erickson et al. |
| 5,714,548 A | 2/1998 | Ma et al. |
| 5,777,039 A | * 7/1998 | De Craene et al. |
| 5,795,834 A | 8/1998 | Deeb et al. |
| 5,804,610 A | 9/1998 | Hamer et al. |
| 5,856,387 A | 1/1999 | Sasaki et al. |
| 5,876,855 A | 3/1999 | Wong et al. |
| 5,885,681 A | 3/1999 | Korpman |

FOREIGN PATENT DOCUMENTS

| | | |
|---|---|---|
| EP | 0 238 863 | 9/1987 |
| EP | 0 352 901 | 1/1990 |
| JP | 10152662 A | 6/1998 |
| JP | 11071558 A | 3/1999 |
| WO | WO 96/25469 | 8/1996 |
| WO | WO 97/23577 | 7/1997 |
| WO | WO 98/10015 | 3/1998 |
| WO | WO 99/11728 | 3/1999 |
| WO | WO 99/15599 | 4/1999 |
| WO | WO 99/18166 | 4/1999 |

OTHER PUBLICATIONS

Satas, ed., *Handbook of Pressure Sensitive Adhesive Technology, second edition,* Van Nostrand Reinhold, New York, Title page, publication page, table of contents, and pp. 172–176 (1989).

Satas, et al., *Handbook of Pressure Sensitive Adhesive Technology, second edition,* Van Nostrand Reinhold, New York, Title page, publication page, table of contents, and pp. 317–373 (1989).

\* cited by examiner

*Primary Examiner*—Tae H. Yoon
(74) *Attorney, Agent, or Firm*—Colene H. Blank

(57) ABSTRACT

Pressure sensitive adhesive compositions and articles, wherein the adhesive includes at least one acrylate pressure sensitive adhesive component and at least one thermoplastic elastomer-based pressure sensitive adhesive component. The acrylate component includes at least one polymerized monofunctional (meth)acrylic acid ester monomer having a Tg of no greater than about 0° C. when homopolymerized, and 0 to about 10 wt % of at least one copolymerized monofunctional ethylenically unsaturated monomer having a Tg of at least about 10° C. when homopolymerized. The thermoplastic elastomer-based pressure sensitive adhesive component includes a radial block copolymer.

25 Claims, No Drawings

PRESSURE SENSITIVE ADHESIVES AND ARTICLES INCLUDING RADIAL BLOCK AND ACRYLIC POLYMERS

BACKGROUND

Pressure sensitive adhesives typically include materials (e.g., elastomers) that are either inherently tacky or that are tackified with the addition of tackifying resins. They can be defined by the Dahlquist criteria described in Handbook of Pressure Sensitive Adhesive Technology, D. Satas, $2^{nd}$ ed., page 172 (1989) at use temperatures. This criterion defines a good pressure sensitive adhesive as one having a 1 second creep compliance of greater than $1\times10^{-6}$ cm$^2$/dyne. Alternatively, since modulus is, to a first approximation, the inverse of compliance, pressure sensitive adhesives may be defined as adhesives having a modulus of less than $1\times10^6$ dynes/cm$^2$.

Another well-known means of identifying a pressure sensitive adhesive is that it is aggressively and permanently tacky at room temperature and firmly adheres to a variety of dissimilar surfaces upon mere contact without the need of more than finger or hand pressure as described in "Glossary of Terms Used in the Pressure Sensitive Tape Industry" provided by the Pressure Sensitive Tape Council, August, 1985.

Another suitable definition of a pressure sensitive adhesive is that it preferably has a room temperature storage modulus within the area defined by the following points as plotted on a graph of modulus versus frequency at 25° C.: a range of moduli from approximately $2\times10^5$ to $4\times10^5$ dynes/cm$^2$ at a frequency of approximately 0.1 radian/second (0.017 Hz), and a range of moduli from approximately $2\times10^6$ to $8\times10^6$ dynes/cm$^2$ at a frequency of approximately 100 radians/second (17 Hz) (for example, see FIGS. 8–16 on p. 173 Handbook of Pressure Sensitive Adhesive Technology, D. Satas, $2^{nd}$ ed., (1989)).

Other methods of identifying a pressure sensitive adhesive are also known. Any of these methods of identifying a pressure sensitive adhesive may be used to identify suitable pressure sensitive adhesives of the present invention.

There is an ongoing need to modify pressure sensitive adhesives to meet the criteria for new applications. In general, additives may be used to modify adhesives; however, when additives are incorporated into pressure sensitive adhesives to modify their properties, care must be taken to avoid a loss in peel adhesion or shear strength.

Major classes of pressure sensitive adhesives include acrylics, polyurethanes, poly-alpha-olefins, silicones, and tackified natural and synthetic rubbers. Some examples of synthetic rubbers include tackified linear, radial (e.g., star), tapered, and branched styrenic block copolymers, such as styrene-butadiene-styrene, styrene-ethylene/butylene-styrene, and styrene-isoprene-styrene. Uncrosslinked acrylics typically have good low temperature adhesion but poor shear strength. Block copolymer adhesives have good shear strength and adhesion at room temperature, but poor adhesion at non-ambient temperatures, and poor shear strength at elevated temperatures.

Generally, when additives are used to alter properties of pressure sensitive adhesives, the additives should be miscible with the pressure sensitive adhesive or form homogeneous blends at the molecular level. Some types of pressure sensitive adhesives have been modified with tackified thermoplastic elastomers (e.g., styrene-isoprene-styrene block copolymers), thermoplastics (e.g., polystyrene, polyethylene, or polypropylene), and elastomers (e.g., polyolefins, natural and synthetic rubbers). For example, thermoplastic materials have been added to acrylic pressure sensitive adhesives. Such materials are described in International Publication Nos. WO 97/23577, WO 95/25469 (all to Minnesota Mining and Manufacturing Co.) as having a substantially continuous domain and a substantially fibrillous to schistose domain. Although such pressure sensitive adhesives are described as having increased peel adhesion relative to the acrylic component or solvent-coated blends of the same components, there is still a need for adhesives exhibiting useful combinations of properties (i.e., peel, shear, clean removal, etc.), particularly at high and low temperatures (i.e., non-ambient temperatures).

SUMMARY OF THE INVENTION

The present invention is directed to pressure sensitive adhesive compositions that include at least one acrylate pressure sensitive adhesive component and at least one thermoplastic elastomer-based pressure sensitive adhesive component. The acrylate pressure sensitive adhesive component includes at least one polymerized monofunctional (meth)acrylic acid ester monomer having a Tg (glass transition temperature) of no greater than about 0° C. when homopolymerized, and 0 to about 10 wt % of at least one copolymerized monofunctional ethylenically unsaturated monomer having a Tg of at least about 10° C. when homopolymerized. The thermoplastic elastomer-based pressure sensitive adhesive component includes a radial block copolymer, and preferably, a tackifying agent. In certain preferred embodiments, the pressure sensitive adhesive composition is crosslinked. This can occur through crosslinking of the individual components or upon crosslinking the composition after combining the individual components.

As used herein, a thermoplastic elastomer (i.e., thermoplastic rubber) is a polymer having at least two homopolymeric blocks or segments, wherein at least one block has a Tg of greater than room temperature (i.e., about 20° C. to about 25° C.) and at least one block has a Tg of less than room temperature. In a thermoplastic elastomer these two blocks are generally phase separated into one thermoplastic glassy phase and one rubbery elastomeric phase. A radial block copolymer is a polymer having more than two arms that radiate from a central core (which can result from the use of a multifunctional coupling agent, for example), wherein each arm has two or more different homopolymeric blocks or segments as discussed above. See, for example, the *Handbook of Pressure Sensitive Adhesive Technology*, D. Satas, $2^{nd}$ ed., Chapter 13 (1989).

Significantly, the present invention provides adhesives with one or more of the following: good low temperature adhesion, high temperature shear strength, clean removal after high temperature applications, and good lifting resistance as measured by low stress peel. Particularly preferred adhesives have all of these properties. In a preferred embodiment, an adhesive tape sample that includes a backing and the pressure sensitive adhesive composition disposed thereon has a peel adhesion value from a glass substrate of at least about 22 Newtons/decimeter (N/dm) at 4° C. and a shear strength value from stainless steel of at least about 100 minutes at 71° C.

In a preferred embodiment, the present invention provides a crosslinked pressure sensitive adhesive composition that includes at least one crosslinked acrylate pressure sensitive adhesive component and at least one thermoplastic elastomer-based pressure sensitive adhesive component. The thermoplastic elastomer-based pressure sensitive adhesive component includes an asymmetric radial block copolymer of the general formula $Q_nY$ wherein Q represents an arm of the asymmetric radial block copolymer and has the formula S-B, n preferably represents the number of arms and is a whole number of at least three, Y is the residue of a multifunctional coupling agent, S is a thermoplastic polymer segment, and B is an elastomeric polymer segment.

Adhesive articles are also provided by the present invention. Such articles include a substrate (i.e., backing) having the pressure sensitive adhesive composition described herein disposed thereon.

DETAILED DESCRIPTION OF PREFERRED EMBODIMENTS

Pressure sensitive adhesive compositions of the present invention are suitable for use in a variety of applications, preferably over a broad temperature range (e.g., about 4° C. to about 93° C.). These adhesives include a unique combination of an acrylate pressure sensitive adhesive component and a thermoplastic elastomer-based pressure sensitive adhesive component. Each of these components is a pressure sensitive adhesive with advantageous properties individually, but when combined result in pressure sensitive adhesive compositions that can be used to provide adhesive articles (e.g., tapes) that demonstrate one or more of the following properties: good low temperature adhesion; good high temperature shear strength; clean removal after high temperature applications; and good lifting resistance as measured by low stress peel. Particularly preferred adhesives of the present invention have all of these properties.

The acrylate pressure sensitive adhesive component includes at least one polymerized monofunctional (meth) acrylic acid ester monomer having a Tg of no greater than about 0C. when homopolymerized, and preferably, at least one copolymerized monofunctional ethylenically unsaturated monomer having a Tg of at least about 10° C. when homopolymerized, which is optionally present in an amount of no greater than about 10 wt %. The thermoplastic elastomer-based pressure sensitive adhesive component includes a radial block copolymer, and preferably, a tackifying agent. Although International Publication Nos. WO 97/23577, WO96/25469 (all to Minnesota Mining and Manufacturing Co.) generally encompass such pressure sensitive adhesive compositions, there is no specific recognition of the advantages of the combination of these particular components, particularly for use in applications at high and low temperatures.

Pressure sensitive adhesive compositions of the present invention exhibit room temperature (e.g., 21° C.) peel adhesion values that are sufficient for many applications, even after high humidity aging. Significantly, pressure sensitive adhesive compositions of the present invention provide adhesive articles that preferably have a peel adhesion value of at least about 22 N/dm (20 ounces/inch, oz/in), more preferably, at least about 33 N/dm (30 oz/in), and most preferably, at least about 44 N/dm (40 oz/in), at 4° C. These values are typically determined according to the test procedure described herein using a glass substrate and an adhesive tape sample that includes a cloth backing laminated with polyethylene (although it is believed that such results can be obtained using other backings) and a 125 µm (5.0 mils) thick layer of the pressure sensitive adhesive composition disposed thereon.

Pressure sensitive adhesive compositions of the present invention exhibit room temperature (e.g., 21° C.) shear strength values that are sufficient for many applications. Significantly, pressure sensitive adhesive compositions of the present invention provide adhesive articles that preferably have a shear value of at least about 100 minutes, and more preferably, at least about 1000 minutes, at 71° C. These values are typically determined according to the test procedure described herein using a stainless steel substrate and an adhesive tape sample that includes a cloth backing laminated with polyethylene (although it is believed that such results can be obtained using other backings) and a 125 µm (5.0 mils) thick layer of the pressure sensitive adhesive composition disposed thereon.

Pressure sensitive adhesive compositions of the present invention exhibit room temperature (e.g., 21° C. ) removability that is sufficient for many applications. Significantly, pressure sensitive adhesive compositions of the present invention provide adhesive articles that preferably leave no greater than about 10% residue (by area), and more preferably, no greater than about 5% residue (by area), upon removal from a substrate after 30 minutes at 93° C. These values are typically determined according to the test procedure described herein using a painted cold rolled steel panel and an adhesive tape sample that includes a cloth backing laminated with polyethylene (although it is believed that such results can be obtained using other backings) and a 125 µm (5.0 mils) thick layer of the pressure sensitive adhesive composition disposed thereon.

Pressure sensitive adhesive compositions of the present invention provide adhesive articles that preferably have a low stress peel of at least about 300 minutes, and more preferably, at least about 1000 minutes. This is a measure of the lifting resistance of the adhesive articles. These values are typically determined according to the test procedure described herein using a stainless steel substrate and an adhesive tape sample that includes a cloth backing laminated with polyethylene (although it is believed that such results can be obtained using other backings) and a 125 µm (5.0 mils) thick layer of the pressure sensitive adhesive composition disposed thereon.

Preferably, pressure sensitive adhesive compositions of the present invention include about 10 weight percent (wt %) to about 90 wt %, and more preferably, about 30 wt % to about 70 wt % of the acrylate pressure sensitive adhesive component. Preferably, the pressure sensitive adhesive of the present invention includes about 10 wt % to about 90 wt %, and more preferably, about 30 wt % to about 70 wt %, of the thermoplastic elastomer-based pressure sensitive adhesive component.

Useful acrylic (i.e., acrylate) pressure sensitive adhesive materials include those having a major amount (e.g., at least about 90 weight percent) of at least one polymerized has monofunctional (meth)acrylic acid ester whose homopolymer has a Tg of no greater than about 0° C., and optionally, at least one copolymerized monofunctional ethylenically unsaturated monomer whose homopolymer has a Tg (glass transition temperature) of at least about 10° C. The monofunctional ethylenically unsaturated monomer is optionally present in an amount of no greater than about 10 wt %, and preferably no greater than about 5 wt %. Included within the scope of the present invention are acrylate pressure sensitive adhesives that have none of this monomer present, although it is preferably present.

The monofunctional (meth)acrylic acid ester is preferably an ester of a nontertiary alcohol in which the alkyl group contains at least about 3 carbon atoms (on average), and preferably about 4 to about 14 carbon atoms (on average).

Typically, the homopolymers of such monomers have a Tg of no greater than about 0° C. The alkyl group of the nontertiary alcohol can optionally contain oxygen atoms in the chain, thereby forming ethers, for example.

The term "(meth)acrylic" as used in this context refers to acrylic and methacrylic. The term "monofunctional" as used in the context of a "monofunctional (meth)acrylic acid ester" refers to a mono-(meth)acrylic monomer or a monomer containing one (meth)acrylic functionality, although other functionality can be present. The term "monofunctional" as used in the context of a "monofunctional ethylenically unsaturated monomer" refers to a monoethylenically unsaturated monomer or a monomer containing one ethylenically unsaturated functionality, although other functionality can be present.

Examples of classes of suitable monofunctional (meth) acrylic acid esters include, but are not limited to, 2-methylbutyl acrylate, 2-ethylhexyl acrylate, isooctyl acrylate, lauryl acrylate, n-decyl acrylate, 4-methyl-2-pentyl acrylate, isoamyl acrylate, sec-butyl acrylate, and isononyl acrylate. Preferred (meth)acrylic acid esters that can be used include, but are not limited to, 2-ethylhexyl acrylate, isooctyl acrylate, lauryl acrylate, and 2-methylbutyl acrylate. Various combinations of such monomers can be employed.

Examples of suitable monofunctional ethylenically unsaturated monomers include, but are not limited to, (meth) acrylic acid, a (meth)acrylamide, a (meth)acrylate, an alpha-olefin, a vinyl ether, an allyl ether, a styrenic monomer, or a maleate. Examples of suitable monofunctional ethylenically unsaturated monomers include, but are not limited to, acrylic acid, methacrylic acid, itaconic acid, maleic acid, fumaric acid, 2-hydroxyethyl acrylate or methacrylate, cyclohexyl acrylate, t-butyl acrylate, phenyl acrylate, isobornyl acrylate, 2-phenoxyethyl acrylate, N-vinyl pyrrolidone, N-vinyl caprolactam, acrylamide, methacrylamide, N-substituted and N,N-disubstituted acrylamides such as N-ethyl acrylamide, N-hydroxyethyl acrylamide, N-octyl acrylamide, N-t-butyl acrylamide, N,N-dimethyl acrylamide, N,N-diethyl acrylamide, and N-ethyl,N-dihydroxyethyl acrylamide. Preferred monofunctional ethylenically unsaturated monomers include, but are not limited to, acrylic acid, t-butyl acrylate, N,N-dimethyl acrylamide, N-octyl acrylamide, isobornyl acrylate, norbornyl acrylate, and 2-phenoxyethyl acrylate. A particularly preferred such monomer is acrylic acid. Various combinations of such monomers can be employed.

The acrylate pressure sensitive adhesive component of the pressure sensitive adhesive composition of the present invention can be crosslinked if desired. Crosslinking can be achieved to employed chemical crosslinks (e.g., covalent bonds or acid-base interactions) and/or physical crosslinks (e.g., from the formation of reinforcing domains due to phase separation). Crosslinking can be achieved by thermal crosslinking agents such as a multifunctional aziridine (e.g., 1,1'-(1,3-phenylene dicarbonyl)-bis-(2-methylaziridine) or "bisamide"); UV-crosslinking agents such as monoethylenically unsaturated aromatic ketone monomers free of ortho-aromatic hydroxyl groups (e.g., acryloxybenzophenone, para-acryloxyethoxybenzophenone, acrylated anthraquinones); high Tg macromers such as those that include vinyl functionality and are based upon poly(styrene) or poly(methyl methacrylate) and which are often referred to as a macromolecular monomer or macromer; metal crosslinkers (e.g., zinc oxide, zinc ammonium carbonate, zinc stearate); high energy electromagnetic radiation such as gamma or e-beam radiation; and/or the pendant acid and base groups. Suitable crosslinking agents are disclosed in U.S. Pat. No. 4,379,201 (Heilmann et al.), U.S. Pat. No. 4,737,559 (Keller et al.), U.S. Pat. No. 5,506,279 (Babu et al.), and U.S. Pat. No. 4,554,324 (Husman et al.). Various combinations of crosslinking agents can also be employed.

Exemplary acrylate pressure sensitive adhesives include those described in U.S. Pat. No. 4,693,776 (Krampe et al.). Other suitable acrylate pressure sensitive adhesives are described in U.S. Pat. Nos. 5,804,610 (Hamer et al.), U.S. Pat. No. 4,833,179 (Young et al.), and RE 24,906 (Ulrich).

The acrylate pressure sensitive adhesive component of the pressure sensitive adhesive composition of the present invention may be inherently tacky or tackified. Preferably, for use in the present invention they are inherently tacky. Useful tackifiers for acrylates include rosin esters, aromatic resins, aliphatic resins, and terpene resins.

The acrylate pressure sensitive adhesive component can be made using a variety of polymerization methods, including solution polymerization, emulsion polymerization, and solventless polymerization. As is known to one of skill in the art, thermal or photoinitiators may be employed in such methods. Suitable methods include those described in U.S. Pat. No. 4,181,752 (Martens et al.), U.S. Pat. No. 4,833,179 (Young et al.), U.S. Pat. No. 5,804,610 (Hamer et al.), U.S. Pat. No. 5,382,451 (Johnson et al.), U.S. Pat. No. 4,619,979 (Kotnour et al.), U.S. Pat. No. 4,843,134 (Kotnour et al.), and U.S. Pat. No. 5,637,646 (Ellis).

The thermoplastic elastomer-based pressure sensitive adhesive component includes a radial block copolymer having more than two arms, and preferably, a radial block polymer having at least three arms, more preferably, at least five arms, and most preferably, at least ten arms. A preferred radial block copolymer is a block copolymer of the general formula $Q_nY$ wherein Q represents an arm of the block copolymer and has the formula S-B, n represents the number of arms and is preferably a whole number of at least three, Y is the residue of a multifunctional coupling agent, S is a thermoplastic polymer segment, and B is an elastomeric polymer segment.

Particularly preferred radial block copolymers of this general formula are asymmetric (i.e., the arms of the block copolymers are not all identical) and are described in U.S. Pat. Nos. 5,393,787 and 5,296,547 (both to Nestegard et al.). Preferred such asymmetric radial block copolymers have the above formula wherein S is a thermoplastic polymer segment endblock of a polymerized monovinyl aromatic homopolymer, preferably with at least two different molecular weight endblocks in the copolymer (e.g., one of about 5000 to about 50,000 number average molecular weight and one of about 1000 to about 10,000 number average molecular weight), and B is an elastomeric polymer segment midblock which connects each arm to the residue of a multifunctional coupling agent and includes a polymerized conjugated diene or combination of conjugated dienes.

Such radial block copolymers can be made by conventional block copolymer polymerization methods, such as a sequential addition anionic polymerization method described in U.S. Pat. Nos. 5,393,787 and 5,296,547 (both to Nestegard et al.). This polymerization method includes the formation of a living polymer of the general structure S-B-M, wherein M is a Group I metal such as Na, Li, or K. The living polymer is then coupled with a multifunctional coupling agent to form a linked block copolymer. Since this coupling reaction may not always go to completion, there may also be some unlinked diblock (S-B) present in the polymer mass. The amount of such unlinked diblock will vary with the coupling efficiency of the linking reaction, and can be as much as 70 wt %, but preferably no more than about 30 wt %, (based on the total weight of the radial block copolymer) of the diblock in the polymer mass.

The monomers that form the polymerized monovinyl aromatic endblocks typically contain about 8 to about 18 carbon atoms. Examples of such monomers include, but are not limited to, styrene, alpha-methylstyrene, vinyltoluene, vinylpyridine, ethylstyrene, t-butylstyrene, isopropylstyrene, dimethylstyrene, and other alkylated styrenes. The monomers that form the polymerized conjugated diene midblocks typically contain about 4 to about 12 carbon atoms. Examples of such monomers include, but are not limited to, butadiene, isoprene, ethylbutadiene, phenylbutadiene piperylene, dimethylbutadiene, ethylhexadiene, and hexadiene. The multifunctional coupling agents suitable for the block copolymer may be any of the polyalkenyl coupling agents or other materials known to have functional groups that can react with carbanions of the living polymer to form linked polymers. Examples of such coupling agents include, but are not limited to, silyl halides, polyepoxides, polyisocyanates, polyketones, polyanhydrides, and aliphatic, aromatic, or heterocyclic polyalkenyls.

The thermoplastic elastomer-based pressure sensitive adhesive component of the pressure sensitive adhesive composition of the present invention typically requires the presence of a tackifying agent (i.e., tackifier). Useful tackifiers include rosin and rosin derivatives, polyterpenes, coumarone indenes, hydrogenated resins, and hydrocarbon resins. Examples include, but are not limited to, alpha pinene-based resins, beta pinene-based resins, limonene-based resins, piperylene-based hydrocarbon resins, esters of rosins, polyterpene and aromatic modified polyterpene resins, aromatic modified piperylene-based hydrocarbon resins, aromatic modified dicyclopentadiene-based hydrocarbon resins, and aromatic modified co-terpene and ter-terpene resins.

The thermoplastic elastomer-based pressure sensitive adhesive component of the pressure sensitive adhesive composition of the present invention can be crosslinked if desired. Crosslinking can be achieved using high energy electromagnetic radiation such as gamma or e-beam radiation, for example. Alternatively, crosslinking can be achieved using a crosslinking agent such as a sulfur, a sulfur-donor, or peroxide curing systems traditionally used for crosslinking unsaturated rubbers. Other means of crosslinking include the use of reactive phenolic resins in combination with a metal catalyst, or the use of a multifunctional acrylate with a photoinitiator and ultraviolet light. Various combinations of crosslinking agents can also be employed.

Plasticizers may also be added to modify the properties of the thermoplastic elastomer-based pressure sensitive adhesive component, such as, for example, conformability or low temperature adhesion.

The acrylate pressure sensitive adhesive component and the thermoplastic elastomer pressure sensitive adhesive component are combined typically using melt extrusion techniques, as described in International Publication Nos. WO 97/23577, WO 96/25469 (all to Minnesota Mining and Manufacturing Co.). Mixing can be done by a wide variety of methods known to those of skill in the art that result in a substantially homogeneous distribution of the components. This can include dispersive mixing, distributive mixing, or a combination thereof. Both batch and continuous methods of mixing can be used. Preferably, the components are combined and the compositions are melt processed prior to crosslinking, if crosslinking is performed. Details of preparation of the compositions of the present invention are described in the examples.

In addition to the additives discussed above, others can be included in each individual pressure sensitive adhesive component of the pressure sensitive adhesive composition of the present invention, or added at the time of mixing the components, to adjust the properties of the adhesive. Such additives include compatibilizing materials, pigments, glass or polymeric bubbles or beads (which may be expanded or unexpanded), fibers, reinforcing agents, hydrophobic and hydrophilic silica, toughening agents, fire retardants, antioxidants, finely ground polymeric particles such as polyester, nylon, and polypropylene, and stabilizers. The additives are added in amounts sufficient to obtain the desired end-use properties.

Typically, and preferably, the pressure sensitive adhesive composition of the present invention is crosslinked after mixing the two major components. Crosslinking can be achieved using high energy electromagnetic radiation such as gamma or e-beam radiation, for example. Alternatively, crosslinking can be achieved after the components are combined using crosslinking agents such as those described above for crosslinking the individual pressure sensitive adhesive components. Various combinations of crosslinking agents can also be employed.

The adhesive compositions of the present invention can be applied to a substrate by a variety of coating methods, including batch and continuous coating hot melt coating methods, as described in International Publication Nos. WO 97/23577, WO 96/25469 (all to Minnesota Mining and Manufacturing Co.). The pressure sensitive adhesive compositions can be solidified by quenching using both direct methods, such as chill rolls or water baths, and indirect methods, such as air or gas impingement. The thickness of the layer of adhesive may vary over a broad range, such as from about 10 microns ($\mu$m) to several hundred microns.

The substrates (i.e., backings) on which the pressure sensitive adhesive compositions can be disposed include, but are not limited to, cloth (e.g., cotton or fabric available under the trade designation RAYON), metallized films and foils, polymeric films, nonwoven polymeric materials, paper, foam backings, etc. Polymeric films include, but are not limited to, polyolefins such as polypropylene, polyethylene, low density polyethylene, linear low density polyethylene and high density polyethylene, polyesters, polycarbonates, cellulose acetates, polyimides, etc. Nonwovens include, but are not limited to, nylon, polypropylene, ethylene-vinyl acetate, polyurethane, etc. Foam backings include, but are not limited to, acrylic, silicone, polyurethane, polyethylene, polypropylene, neoprene rubber, etc. The substrates can be layered or made of composite materials if desired. For example, a preferred backing, is a cloth backing laminated to polyethylene.

Once the adhesive composition has been coated, and optionally crosslinked, the adhesive surface of the article may, optionally, be protected with a temporary, removable release liner (i.e., protective liner) such as a polyolefin (e.g., polyethylene or polypropylene) or polyester (e.g., polyethylene terephthalate) film, or a plastic film. Such films may be treated with a release material such as silicones, waxes, fluorocarbons, and the like.

The pressure sensitive adhesive compositions of the present invention can be used in a wide variety of adhesive articles, including medical tapes, sealing tapes, electrical tapes, repositionable tapes, die-cut graphics, wall decoration films, and particularly in removable tapes, such as masking tapes, sheets, and drapes.

Test Methods

Room and Low Temperature Peel Adhesion Tests

Pressure sensitive adhesive (PSA) tape samples, measuring 1.25 cm (width)×15 cm (length), were conditioned for greater than 24 hours at approximately 21° C. and 50% relative humidity. These were then tested for peel adhesion from a clean glass substrate after exposure at one of two different conditions. Under the first condition (Room Temperature Peel Adhesion), the tape sample was adhered to the test substrate surface using one pass of a 2.1 kilogram (g) rubber-faced roller and tested using a Model 3M90 Slip/Peel tester (from IMASS, Inc., Accord, Massachusetts) at an angle of 180° at a peel rate of 228.6 centimeters/minute (cm/min) all at a temperature of approximately 70° F. (21° C.) and 50% Relative Humidity. Under the second condition (Low Temperature Peel Adhesion) the tape sample, substrate, and peel tester were conditioned for 24 hours at a temperature of approximately 40° F. (4° C.) and tested at a temperature of approximately 40° F. (4° C.) using the method described above.

Peel Adhesion After High Humidity Aging Test

Pressure sensitive adhesive tape samples were conditioned and tested as described above with the following modifications. The substrate was clean stainless steel, the PSA tape was adhered to the substrate surface using four passes of a 2.1-kg rubber-faced roller after both were first conditioned at 70° F. (21° C.) and 50% Relative Humidity for more than 24 hours. The taped substrate was aged at 70° F. (21° C.) and 90% Relative Humidity for 24 hours then removed and stored at 70° F. (21° C.) and 50% Relative Humidity for 1 hour before measuring peel adhesion strength at 70° F. (21° C.).

Room and Elevated Temperature Shear Strength Tests

Shear strength, as determined by holding time, was measured on PSA tape samples at both room and elevated temperatures. A roll of the tape sample was conditioned for greater than 24 hours at approximately 21° C. and 50% relative humidity. These were then tested for shear strength from a clean stainless steel substrate. The tape samples, measuring 12.5 cm (width)×25 cm (length), were adhered to the test substrate surface using four passes of a 2.1-kg rubber-faced roller. For testing at room temperature (70° F., 21° C.) the taped substrate was placed in a vertical holding rack and a static 500-gram load was attached to the tape at an angle of 180 degrees, and the time it took for the load to drop was measured in minutes. For testing at 160° F. (71° C.), the taped substrates were placed in a holding rack and conditioned at that temperature for 15 minutes before a 500-gram weight was hung from each sample. At both test temperatures the time it took for the weight to drop was recorded in minutes. For those samples still adhering to the substrate after 4000 minutes, the test was discontinued.

Low Stress Peel Adhesion Strength

Low stress peel adhesion strength, as determined by holding time, was measured on PSA tape samples at room temperature (70° F., 21° C.). The tape sample (in roll form) and stainless steel substrate were conditioned for greater than 24 hours at approximately 21° C. and 50% relative humidity. The tape sample was then tested for low stress peel adhesion strength from a clean, 10.2 cm long stainless steel substrate. The tape sample, measuring 1.90 cm (width)×10.2 cm (length), was adhered to the stainless steel substrate using four passes of a 2.1-kg rubber-faced roller. The taped substrate was placed on the bottom side of a horizontal holding rack with the taped side facing down and a static load of 200 grams was attached to the tape at an angle of 90 degrees. The time it took for the load to drop was measured in minutes. For those samples still adhering to the substrate after 5500 minutes, the test was discontinued.

Removability After Temperature Aging rolled steel panel after aging at elevated temperature was determined by observing the amount of residual adhesive present upon removal of the tape after exposure to 200° F. (93° C.) for 30 minutes. The tape sample (in roll form) and painted cold rolled steel substrate (ACT Cold Rolled Steel B952 P60 DIW; Unpolish Topcoat AG129W1133 White, available as AIN100253 from ACT Laboratories, Incorporated, Hillsdale, Mich.) were conditioned for greater than 24 hours at approximately 70° F. (21° C.) and 50% relative humidity. The tape sample, measuring 1.27 cm (width)×10.2 cm (length), was then adhered to the painted cold rolled steel substrate, which measured 10.2 cm (width)×20.3 cm (length)×0.08 cm (thickness), using four passes of a 2.1-kg rubber-faced roller. The taped substrate was placed in an oven preheated to 200° F. (93° C.) for 30 minutes. After 30 minutes, the oven door was opened and a 5.1-cm length of the tape was immediately peeled off the hot substrate by hand at an angle of 180 degrees. The partially detaped substrate was then removed from the oven, allowed to cool to room temperature in a controlled environment having a temperature of approximately 21° C. and 50% relative humidity, followed by peeling of the remaining length of tape by hand at an angle of 180 degrees. The amount of adhesive residue remaining in each area of the detaped substrate was visually estimated by eye and reported as a percentage of the total taped area for "93° C." and "21° C." removal, respectively.

| Material | Description |
|---|---|
| | Materials Used |
| PSA A | 90 parts isooctyl acrylate and 10 parts acrylic acid, polymerized in a polyethylene shell as described in U.S. Pat. No. 5,804,610 (Hamer et al), Composition D-1 in Table 5, with the following modifications. Isooctylthioglycolate chain transfer agent (0.015 pph) was employed; and an intensity of 3.52 mW/cm² was applied for 510 seconds. |
| PSA B | A suspension polymerized acrylic pressure sensitive adhesive was prepared in accordance with U.S. Pat. No. 4,833,179 (Young et al) in the following manner. A two liter split reactor equipped with a condenser, thermowell, nitrogen inlet, stainless steel motor-driven agitator, and a heating mantle with temperature control was charged with 750 grams (g) deionized water, to which was added 2.5 g zinc oxide and 0.75 g hydrophilic silica (CAB-O-SIL EH-5, available from Cabot Corporation, Cambridge, MA). This was heated to 55° C. with stirring, while purging with nitrogen, until the zinc oxide and silica were thoroughly dispersed. At this point, a charge of 480 g isooctyl acrylate, 20 g methacrylic acid, 2.5 g VAZO 64 (azo-bis(isobutyronitrile), AIBN, available from DuPont, Wilmington, DE) initiator, and 0.5 g isooctylthioglycolate chain transfer agent were mixed together. The resulting solution with initiator and chain transfer agent was then added to the initial aqueous mixture while vigorous agitation (700 rpm) was maintained to obtain a good suspension. The reaction was continued with nitrogen purging for at least 6 hours, during which time the reaction was monitored to maintain a reaction temperature of less than 70° C. The resulting pressure sensitive adhesive was collected and dried to at least 90% solids (w/w) having a composition of 96 parts |

-continued

Materials Used

| Material | Description |
|---|---|
| | isooctyl acrylate and 4 parts methacrylic acid. |
| PSA C | 90 parts isooctyl acrylate and 10 parts acrylic acid, solution polymerized to an give an inherent viscosity of 0.7, was prepared according to U.S. Pat. No. RE 24,906 (Ulrich) and dried. |
| Star Block Copolymer A | A star block copolymer (one type of radial block copolymer) made as described for Polymer B in Table 2 of U.S. Pat. No. 5,296,547. |
| Star Block Copolymer B | A styrene/isoprene multiarm block copolymer having a styrene content of 10% by weight, available from Shell Chemical Company, Houston, TX, under the trade designation KRATON D-1320. |
| KRATON D-1107 | A linear styrene/isoprene/styrene block copolymer containing 14% styrene, available from Shell Chemical Company, Houston, TX, under the trade designation KRATON D-1107. |
| ESCOREZ 1310 | A tackifying resin, available from Exxon Chemical Company, Houston, TX, under the trade designation ESCOREZ D-1310. |
| ESCOREZ 2520 | A liquid tackifying resin, available from Exxon Chemical Company, Houston, TX, under the trade designation ESCOREZ 2520. |
| IRGANOX 1010 | An antioxidant, available from Ciba-Geigy, Hawthorne, NY, under the trade designation IRGANOX 1010. |

EXAMPLES

This invention is further illustrated by the following examples, which are not intended to limit the scope of the invention. In the examples, all parts, ratios and percentages are by weight unless otherwise indicated. The test methods described above were used to characterize the pressure sensitive adhesive tapes in the examples. The results are rounded to the nearest whole number.

Example 1

A blend of a star block copolymer-based pressure sensitive adhesive (PSA) and an acrylic-based PSA was prepared and evaluated as described below. More specifically, a star block copolymer-based pressure sensitive adhesive (PSA) was prepared by mixing 50 parts Star Block Copolymer A, 50 parts of a tackifying resin available under the trade designation ESCOREZ 1310, and 1 part of an antioxidant available under the trade designation IRGANOX 1010 in a 300 cm³ bowl Brabender batch mixer (from Brabender Instruments, South Hackensack, N.J.) operating at 50 revolutions per minute (rpm) and 160° C. for 5 minutes (min). Acrylic PSA A was then introduced to the mixture and the total mixture was then processed for an additional 5 minutes to form a blend of pressure sensitive adhesives. The PSA blend was subsequently fed at 200° F. (93° C.) by a Bonnot extruder (Bonnot Model 2WPKR, 50 mm, from Bonnot Manufacturing, Uniontown, Ohio) into a twin-screw extruder (18 mm Haake Microl8 Extruder, available from Leistritz Corporation, Sommerville, N.J.). The temperature was maintained at 177° C. (350° F.) in each of the six zones of the twin-screw extruder, which was continuously discharged at a pressure of at least about 0.69 megapascal (MPa, 100 psi) into a 15.2 centimeters (cm, 6 inch) wide contact die. The die was maintained at 177° C. (350° F.) and the die gap was 0.5 millimeter (mm) to 0.8 mm (20 mils to 30 mils). The adhesive blend was fed between a 190.5 μm (0.0075 inches) thick cloth laminated with polyethylene (available as polycoated cloth scrim 40×30 thread count, available under the trade designation #30 RAYON (70P) from Itochu International, Incorporated, New York, N.Y.) and a release coated paper web at a rate of 2.72 kilograms/hour (6 pounds/hour). The construction was fed at a rate of 4.6 meters/minute (15 feet/minute) between chill rolls maintained at a temperature of 21° C. (70° F.) to form an adhesive tape with a PSA blend layer thickness of about 125 μm (5.0 mils). The resulting adhesive tape, having a block copolymer PSA:acrylic PSA ratio of 30:70 (weight/weight, w/w), was evaluated for peel adhesion strength at 70° F. (21° C.) and 40° F. (4° C.). The results are shown in Table 1.

Example 2

Example 1 was repeated with the following modification. PSA A was prepared to give a composition of 95:5 isooctyl acrylate:acrylic acid (w/w). The resulting adhesive tape was evaluated as described in Example 1 and the results reported in Table 1.

Example 3

Example 1 was repeated with the following modification. Star Block Copolymer B was used in place of Star Block Copolymer A. The resulting adhesive tape was evaluated as described in Example 1 and the results reported in Table 1.

Example 4

Example 1 was repeated with the following modifications. The block copolymer available under the trade designation KRATON D-1107 was used in place of Star Block Copolymer A, and PSA B was used in place of PSA A. The resulting adhesive tape was evaluated as described in Example 1 and the results reported in Table 1.

Example 5

Example 4 was repeated with the following modification. PSA C was used in place of PSA B. The resulting adhesive tape was evaluated as described in Example 1 and the results reported in Table 1.

Comparative Example 1

Example 1 was repeated with the following modification. PSA A was prepared to give a composition of 87.5:12.5 isooctyl acrylate:acrylic acid (w/w). The resulting adhesive tape was evaluated as described in Example 1 and the results reported in Table 1.

Comparative Example 2

Example 1 was repeated with the following modification. PSA A was prepared to give a composition of 85:15 isooctyl acrylate:acrylic acid (w/w). The resulting adhesive tape was evaluated as described in Example 1 and the results reported in Table 1.

Comparative Example 3

Example 1 was repeated with the following modification. PSA A was prepared to give a composition of 82.5:17.5 isooctyl acrylate:acrylic acid (w/w). The resulting adhesive tape was evaluated as described in Example 1 and the results reported in Table 1.

Comparative Example 4

Example 1 was repeated with the following modification. PSA A was prepared to give a composition of 80:20 isooctyl acrylate:acrylic acid (w/w). The resulting adhesive tape was evaluated as described in Example 1 and the results reported in Table 1.

TABLE 1

| Example | % Acrylic Acid (in Acrylic PSA) | 70° F. (21° C.) Peel Adhesion in oz/in (N/dm) | 40° F. (4° C.) Peel Adhesion in oz/in (N/dm) |
|---|---|---|---|
| 1 | 10 | 90 oz/in (99 N/dm) | 46 oz/in (50 N/dm) |
| 2 | 5 | 74(81) | 65(70) |
| 3 | 5 | 90(99) | 32(35) |
| 4 | 4 | 56(61) | 84(93) |
| 5 | 10 | 128(140) | 145(159) |
| CE1 | 12.5 | 62(68) | 8(9) |
| CE2 | 15 | 34(37) | 2(3) |
| CE3 | 17.5 | 18(20) | 1(1) |
| CE4 | 20 | 5(6) | 1(1) |

CE = Comparative Example

Example 6

A blend of a star block copolymer-based PSA and an acrylic-based PSA was prepared and evaluated as described below. More specifically, into the throat of a twin-screw extruder (30 mm diameter, fully-intermeshing, co-rotating extruder, L/D 37/1, available from Werner Pfleiderer Co., Ramsey, N.J.) was fed 100 parts Star Block Copolymer A (zone 1), followed by addition of a mixture of 19.3 parts of ESCOREZ 1310 and 2 parts of IRGANOX 1010 (zone 3), 45.2 parts of ESCOREZ 1310 (zone 5), 27.8 parts of the acrylic PSA used in Example 2 (zone 7), which was fed at 200° F. (93° C.) by a Bonnot extruder (Bonnot Model 2WPKR, 50 mm, from Bonnot Manufacturing, Uniontown, Ohio), and 85.5 parts ESCOREZ 2520 (zone 9). The zone temperatures 1-10 were progressively increased from about 54° C. to about 145° C., with each feed zone being somewhat lower in temperature than the zones on either side of it. Zones 11-13 were maintained at about 143° C. to about 150° C. The melt mixture was passed through a 15.2 cm (6 inch) wide contact die onto a RAYON cloth laminated with polyethylene (available as polycoated cloth scrim 40x30 thread count, #30 RAYON (70P) from Itochu International, Incorporated, New York, N.Y.). This backing was corona treated on both sides and an acrylic-polyurethane low adhesion backsize (LAB) was applied to one side prior to extruding the PSA blend onto the side opposite that having the LAB treatment. The die was maintained at 160° C. and the die gap was 0.5 mm to 0.8 mm (20 mils to 30 mils). A coated adhesive thickness of 0.005 inch (125 µm) was obtained. The adhesive side of the tape was then irradiated with 4 Megarads (Mrads) at 175 kilovolts (kV) using an Eletrocurtain CB-300 electron beam system (available from Energy Sciences, Incorporated, Wilmington, Mass.). The resulting adhesive tape, having a block copolymer PSA:acrylic PSA ratio of 90:10 (w/w), was evaluated for peel adhesion strength at 70° F. (21° C.), 40° F. (4° C.) and after high humidity aging, as well as low stress peel adhesion strength as described in the test methods above. The results are shown in Table 2.

Example 7

Example 6 was repeated with the following modification. The PSA ratio of block copolymer PSA:acrylic PSA was changed to 70:30. The resulting adhesive tape was evaluated as described in Example 6 and the results reported in Table 2.

Example 8

Example 6 was repeated with the following modification. The PSA ratio of block copolymer PSA:acrylic PSA was changed to 50:50. The resulting adhesive tape was evaluated as described in Example 6 and the results reported in Table 2.

Example 9

Example 6 was repeated with the following modification. The PSA ratio of block copolymer PSA:acrylic PSA was changed to 30:70. The resulting adhesive tape was evaluated as described in Example 6 and the results reported in Table 2.

Comparative Example 5

Example 6 was repeated with the following modification. The PSA ratio of block copolymer PSA:acrylic PSA was changed to 100:0. The acrylic PSA was omitted from the extruded composition. The resulting adhesive tape was evaluated as described in Example 6 and the results reported in Table 2.

Comparative Example 6

Example 6 was repeated with the following modification. The PSA ratio of block copolymer PSA:acrylic PSA was changed to 0:100. Only the acrylic PSA was extruded onto the backing. The resulting adhesive tape was evaluated as described in Example 6 and the results reported in Table 2.

TABLE 2

| Ex. | PSA Ratio (BCP: Acrylic) (w/w) | 70° F. (21° C.) Peel Adhesion (oz/in and N/dm) | 40° F. (4° C.) Peel Adhesion (oz/in and N/dm) | Peel Adhesion After Aging (oz/in and N/dm) | Low Stress Peel Adhesion (minutes) |
|---|---|---|---|---|---|
| CE 5 | 100:0 | 145(159) | 177(194) | 65(71) | 145 |
| 6 | 90:10 | 60(66) | 58(64) | 51(56) | 2266 |
| 7 | 70:30 | 87(95) | 75(82) | 125(137) | 2424 |
| 8 | 50:50 | 85(93) | 83(91) | 108(118) | 4629 |
| 9 | 30:70 | 68(75) | 79(87) | 50(55) | >5500 |
| CE 6 | 0:100 | 78(86) | 105(115) | 31(34) | 117 |

CE = Comparative Example
BCP = Block Copolymer
Values in N/dm are in parentheses Example 10

Example 6 was repeated with the following modifications. The following materials and amounts were employed: 100 parts Star Block Copolymer A (zone 1), followed by addition of a mixture of 30 parts of ESCOREZ 1310 and 2 parts of IRGANOX 1010 (zone 3), 70 parts of ESCOREZ 1310 (zone 5), and 86.6 parts of the acrylic PSA used in Example 2 (zone 7). The resulting PSA ratio of block copolymer PSA:acrylic PSA was 70:30. The adhesive tape obtained was evaluated for peel adhesion strength at 70° F. (21° C.) and 40° F. (4° C.), shear strength at 70° F. (21° C.) and 160° F. (71° C.), low stress peel, and removability at 70° F. (21° C.) and 200° F. (93° C.) as described in the test methods above. The results are shown in Table 3 below.

Comparative Example 7

Example 10 was repeated with the following modification. The coated PSA blend was not exposed to electron beam irradiation. The adhesive tape obtained was evaluated for peel adhesion strength at 70° F. (21° C.) and 40° F. (4° C.), shear strength at 70° F. (21° C.) and 160° F. (71° C.), low stress peel, and removability at 70° F. (21° C.) and 200° F. (93° C.) as described in the test methods above. The results are shown in Table 3 below.

Example 11

Example 10 was repeated with the following modification. The resulting PSA ratio of block copolymer PSA:acrylic PSA was 50:50. The adhesive tape obtained was evaluated for peel adhesion strength at 70° F. (21° C.) and 40° F. (4° C.), shear strength at 70° F. (21° C.) and 160° F. (71° C.), low stress peel, and removability at 70° F. (21° C.) and 200° F. (93° C.) as described in the test methods above. The results are shown in Table 3 below.

Comparative Example 8

Example 11 was repeated with the following modification. The coated PSA blend was not exposed to electron beam irradiation. The adhesive tape obtained was evaluated for peel adhesion strength at 70° F. (21° C.) and 40° F. (4° C.), shear strength at 70° F. (21° C.) and 160° F. (71° C.), low stress peel, and removability at 70° F. (21° C.) and 200° F. (93° C.) as described in the test methods above. The results are shown in Table 3 below.

Comparative Example 9

Example 10 was repeated with the following modifications. KRATON D-1107 was used in place of Star Block Copolymer A. The coated PSA blend was not exposed to electron beam irradiation. The adhesive tape obtained was evaluated for peel adhesion strength at 70° F. (21° C.) and 40° F. (4° C.), shear strength at 70° F. (21° C.) and 160° F. (71° C.), low stress peel, and removability at 70° F. (21° C.) and 200° F. (93° C.) as described in the test methods above. The results are shown in Table 3 below.

Comparative Example 10

Comparative Example 9 was repeated with the following modification. The coated PSA blend was exposed to electron beam irradiation. The adhesive tape obtained was evaluated for peel adhesion strength at 70° F. (21° C.) and 40° F. (4° C.), shear strength at 70° F. (21° C.) and 160° F. (71° C.), low stress peel, and removability at 70° F. (21° C.) and 200° F. (93° C.) as described in the test methods above. The results are shown in Table 3 below.

Comparative Example 11

Comparative Example 9 was repeated with the following modification. The resulting PSA ratio of block copolymer:acrylic was 50:50. The adhesive tape obtained was evaluated for peel adhesion strength at 70° F. (21° C.) and 40° F. (4° C.), shear strength at 70° F. (21° C.) and 160° F. (71° C.), low stress peel, and removability at 70° F. (21° C.) and 200° F. (93° C.) as described in the test methods above. The results are shown in Table 3 below.

Comparative Example 12

Comparative Example 11 was repeated with the following modification. The coated PSA blend was exposed to electron beam irradiation. The adhesive tape obtained was evaluated for peel adhesion strength at 70° F. (21° C.) and 40° F. (4° C.), shear strength at 70° F. (21° C.) and 160° F. (71° C.), low stress peel, and removability at 70° F. (21° C.) and 200° F. (93° C.) as described in the test methods above. The results are shown in Table 3 below.

TABLE 3

| Ex. | Peel Adhesion (oz/in and N/dm) | | Shear Strength (minutes) | | Low Stress Peel Adhesion (minutes) | Removability After Temperature Aging (% Residue) | |
| --- | --- | --- | --- | --- | --- | --- | --- |
| | 4° C. | 21° C. | 21° C. | 71° C. | | 21° C. | 93° C. |
| 10 | 132 (145) | 71 (78) | >4000 | >4000 | 4149 | 0 | 0 |
| CE 7 | 91 (100) | 64 (70) | 912 | 1 | 899 | 0 | 100 |
| 11 | 44 (48) | 63 (69) | >4000 | >4000 | 307 | 0 | 0 |
| CE 8 | 83 (91) | 82 (90) | 260 | 1 | 841 | 0 | 100 |
| CE 9 | 108 (118) | 136 (149) | 1392 | 2 | 2222 | 0 | 100 |
| CE 10 | 160 (175) | 131 (144) | >4000 | 182 | 9208 | 0 | 100 |
| CE 11 | 167 (183) | 164 (180) | 46 | 1 | 425 | 0 | 100 |
| CE 12 | >170* (>186) | 172 (189) | >4000 | 98 | 1660 | 100 | 100 |

CE = Comparative Example
*= backing broke
Values in N/dm are in parentheses

Example 12

Example 7 was repeated with the following modifications. A PSA blend of 102.0 pbw of PSA A (30.0 weight percent, wt %), 100.0 pbw Star Block Copolymer A (29.4 wt %), 41.9 pbw ESCOREZ 1310 (14.4 wt %), and 96.2 pbw ESCOREZ 2520 (28.3 wt %) was employed, and the coextruded adhesive was not irradiated with electron beam. The adhesive tape obtained was evaluated for peel adhesion strength at 70° F. (21° C.), 40° F. (4° C.) and after high humidity aging, and low stress peel as described in the test methods above. The results are shown in Table 4 below.

Example 13

Example 12 was repeated with the following modifications. The co-extruded adhesive was exposed to electron beam irradiation as described in Example 7. The adhesive tape obtained was evaluated for peel adhesion strength at 70° F. (21° C.), 40° F. (4° C.) and after high humidity aging, and low stress peel as described in the test methods above. The results are shown in Table 4 below.

Example 14

Example 12 was repeated with the following modifications. A PSA blend of 102.0 pbw of PSA A (30.0 wt %), 100.0 pbw Star Block Copolymer A (29.4 wt %), 87.4 pbw ESCOREZ 1310 (25.7 wt %), and 50.7 pbw ESCOREZ 2520 (14.9 wt %) was employed. The adhesive tape obtained was evaluated for peel adhesion strength at 70° F. (21° C.), 40° F. (4° C.) and after high humidity aging, and low stress peel as described in the test methods above. The results are shown in Table 4 below.

Example 15

Example 14 was repeated with the following modification. The co-extruded adhesive was exposed to electron beam irradiation as described in Example 7. The adhesive tape obtained was evaluated for peel adhesion strength at 70° F. (21° C.), 40° F. (4° C.) and after high humidity aging, and low stress peel as described in the test methods above. The results are shown in Table 4 below.

Example 16

Example 12 was repeated with the following modifications. A PSA blend of 82.4 pbw of PSA A (30.0 wt %), 100.0 pbw Star Block Copolymer A (36.4 wt %), 49.2 pbw ESCOREZ 1310 (17.9 wt %), and 43.1 pbw ESCOREZ 2520 (15.7 wt %) was employed. The adhesive tape obtained was evaluated for peel adhesion strength at 70° F. (21° C.), 40° F. (4° C.) and after high humidity aging, and low stress peel as described in the test methods above. The results are shown in Table 4 below.

Example 17

Example 16 was repeated with the following modification. The co-extruded adhesive was exposed to electron beam irradiation as described in Example 7. The adhesive tape obtained was evaluated for peel adhesion strength at 70° F. (21° C.), 40° F. (4° C.) and after high humidity aging, and low stress peel as described in the test methods above. The results are shown in Table 4 below.

Example 18

Example 12 was repeated with the following modifications. A PSA blend of 82.4 pbw of PSA A (30.0 wt %), 100.0 pbw Star Block Copolymer A (36.4 wt %), 85.6 pbw ESCOREZ 1310 (31.2 wt %), and 6.7 pbw ESCOREZ 2520 (2.4 wt %) was employed. The adhesive tape obtained was evaluated for peel adhesion strength at 70° F. (21° C.), 40° F. (4° C.) and after high humidity aging, and low stress peel as described in the test methods above. The results are shown in Table 4 below.

Example 19

Example 18 was repeated with the following modification. The co-extruded adhesive was exposed to electron beam irradiation as described in Example 7. The adhesive tape obtained was evaluated for peel adhesion strength at 70° F. (21° C.), 40° F. (4° C.) and after high humidity aging, and low stress peel as described in the test methods above. The results are shown in Table 4 below.

Example 20

Example 12 was repeated with the following modifications. A PSA blend of 91.2 pbw of PSA A (30.0 wt %), 100.0 pbw Star Block Copolymer A (32.9 wt %), 66.6 pbw ESCOREZ 1310 (21.9 wt %), and 46.2 pbw ESCOREZ 2520 (15.2 wt %) was employed. The adhesive tape obtained was evaluated for peel adhesion strength at 70° F. (21° C.), 40° F. (4° C.) and after high humidity aging, and low stress peel as described in the test methods above. The results are shown in Table 4 below.

Example 21

Example 20 was repeated with the following modification. The co-extruded adhesive was exposed to electron beam irradiation as described in Example 7. The adhesive tape obtained was evaluated for peel adhesion strength at 700° F. (21° C.), 40° F. (4° C.) and after high humidity aging, and low stress peel as described in the test methods above. The results are shown in Table 4 below.

Comparative Example 13

Comparative Example 5 was repeated with the following modification. The co-extruded adhesive was not exposed to electron beam irradiation. The adhesive tape obtained was evaluated for peel adhesion strength at 70° F. (21° C.), 40° F. (4° C.) and after high humidity aging, and low stress peel as described in the test methods above. The results are shown in Table 4 below.

Comparative Example 14

Comparative Example 6 was repeated with the following modification. The co-extruded adhesive was not exposed to electron beam irradiation. The adhesive tape obtained was evaluated for peel adhesion strength at 70° F. (21° C.), 40° F. (4° C.) and after high humidity aging, and low stress peel as described in the test methods above. The results are shown in Table 4 below.

TABLE 4

| Ex. | 70° F. (21° C.) Peel Adhesion (oz/in and N/dm) | 40° F. (4° C.) Peel Adhesion (oz/in and N/dm) | Peel Adhesion After Aging (oz/in and N/dm) | Low Stress Peel Adhesion (minutes) |
|---|---|---|---|---|
| CE 13 | 164(180) | 183(201) | 50(55) | 116 |
| CE 5 | 145(159) | 177(194) | 65(71) | 145 |
| 12 | 151(166) | 133(146) | 118(129) | 50 |
| 13 | 156(171) | 133(146) | 154(169) | 4050 |
| 14 | 138(151) | 185(203) | 146(160) | 1128 |
| 15 | 145(159) | 202(222) | 128(140) | 4049 |
| 16 | 102(112) | 115(126) | 80(88) | 1517 |
| 17 | 93(102) | 85(93) | 102(112) | 7418 |
| 18 | 112(123) | 112(123) | 88(97) | 1276 |
| 19 | 112(123) | 113(124) | 84(92) | 8355 |
| 20 | 106(116) | 159(174) | 99(109) | 966 |
| 21 | 100(110) | 160(175) | 102(112) | 4047 |
| CE 14 | 86(94) | 116(127) | 50(55) | 278 |
| CE 6 | 78(86) | 105(115) | 31(34) | 117 |

CE = Comparative Example
Values in N/dm are in parentheses

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention.

It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed:

1. A pressure sensitive adhesive composition comprising:
   at least one acrylate pressure sensitive adhesive component comprising:
   at least one polymerized monofunctional (meth)acrylic acid ester monomer having a Tg of no greater than about 0° C. when homopolymerized; and
   0 to about 10 wt % of at least one copolymerized monofunctional ethylenically unsaturated monomer having a Tg of at least about 10° C. when homopolymerized; and
   at least one thermoplastic elastomer-based pressure sensitive adhesive component comprising a radial block copolymer,
   wherein the acrylate pressure sensitive adhesive component and the thermoplastic elastomer-based pressure sensitive adhesive component are crosslinked.

2. The pressure sensitive adhesive composition of claim 1 wherein the copolymerized monomer having a Tg of at least about 10° C. when homopolymerized is acrylic acid.

3. The pressure sensitive adhesive composition of claim 1 wherein the radial block copolymer is asymmetric.

4. The pressure sensitive adhesive composition of claim 3 wherein the asymmetric radial block copolymer is of the general formula $Q_nY$ wherein:
   Q represents an arm of the asymmetric radial block copolymer and has the formula S-B;
   n represents the number of arms and is a whole number of at least three;
   Y is the residue of a multifunctional coupling agent;
   S is a thermoplastic polymer segment; and
   B is an elastomeric polymer segment.

5. The pressure sensitive adhesive composition of claim 1 wherein the monomer having a Tg of at least about 10° C. when homopolymerized is optionally present in the acrylate pressure sensitive adhesive component in an amount of no greater than about 5 wt %.

6. The pressure sensitive adhesive composition of claim 1 comprising about 10 wt % to about 90 wt % of the acrylate pressure sensitive adhesive component.

7. The pressure sensitive adhesive composition of claim 1 comprising about 10 wt % to about 90 wt % of the thermoplastic elastomer-based pressure sensitive adhesive component.

8. The pressure sensitive adhesive composition of claim 1 wherein an adhesive tape sample comprising a backing and the pressure sensitive adhesive composition disposed thereon has a peel adhesion value from a glass substrate of at least about 22 N/dm at 4° C.

9. The pressure sensitive adhesive composition of claim 1 wherein an adhesive tape sample comprising a backing and the pressure sensitive adhesive composition disposed thereon has a shear strength value from stainless steel of at least about 100 minutes at 71° C.

10. The pressure sensitive adhesive composition of claim 9 wherein an adhesive tape sample comprising a backing and the pressure sensitive adhesive composition disposed thereon has a shear strength value from stainless steel of at least about 1000 minutes at 71° C.

11. The pressure sensitive adhesive composition of claim 1 wherein an adhesive tape sample comprising a backing and the pressure sensitive adhesive composition disposed thereon leaves no greater than about 10% residue, by area, upon removal from a painted cold rolled steel panel after 30 minutes at 93° C.

12. The pressure sensitive adhesive composition of claim 11 wherein an adhesive tape sample comprising a backing and the pressure sensitive adhesive composition disposed thereon leaves no greater than about 5% residue, by area, upon removal from a painted cold rolled steel panel after 30 minutes at 93° C.

13. The pressure sensitive adhesive composition of claim 1 wherein an adhesive tape sample comprising a backing and the pressure sensitive adhesive composition disposed thereon has a low stress peel adhesion value from stainless steel of at least about 300 minutes.

14. The pressure sensitive adhesive composition of claim 13 wherein an adhesive tape sample comprising a backing and the pressure sensitive adhesive composition disposed thereon has a low stress peel adhesion value from stainless steel of at least about 1000 minutes.

15. A pressure sensitive adhesive article comprising a substrate and a pressure sensitive adhesive composition disposed thereon, wherein the pressure sensitive adhesive composition comprises:
   at least one acrylate pressure sensitive adhesive component comprising:
   at least one polymerized monofunctional (meth)acrylic acid ester monomer having a Tg of no greater than about 0° C. when homopolymerized; and
   0 to about 10 wt % of at least one copolymerized monofunctional ethylenically unsaturated monomer having a Tg of at least about 10° C. when homopolymerized; and
   at least one thermoplastic elastomer-based pressure sensitive adhesive component comprising a radial block copolymer,
   wherein the acrylate pressure sensitive adhesive component and the thermoplastic elastomer-based pressure sensitive adhesive component are crosslinked.

16. The pressure sensitive adhesive article of claim 15 wherein the copolymerized monomer having a Tg of at least about 10° C. when homopolymerized is acrylic acid.

17. The pressure sensitive adhesive article of claim 15 wherein the radial polymer has at least five arms.

18. The pressure sensitive adhesive article of claim 15 wherein the monomer having a Tg of at least about 10° C. when homopolymerized is optionally present in an amount of no greater than about 5 wt %.

19. The pressure sensitive adhesive article of claim 15 wherein the monomer having a Tg of at least about 10° C. when homopolymerized is present in an amount of no greater than about 10 wt %.

20. The pressure sensitive adhesive article of claim 15 wherein an adhesive tape sample comprising a backing and the pressure sensitive adhesive composition disposed thereon has a peel adhesion value from a glass substrate of at least about 22 N/dm at 4° C.

21. The pressure sensitive adhesive article of claim 15 wherein an adhesive tape sample comprising a backing and the pressure sensitive adhesive composition disposed thereon has a shear strength value from stainless steel of at least about 100 minutes at 71° C.

22. The pressure sensitive adhesive article of claim 15 wherein an adhesive tape sample comprising a backing and the pressure sensitive adhesive composition disposed thereon leaves no greater than about 10% residue, by area, upon removal from a painted cold rolled steel panel after 30 minutes at 93° C.

23. The pressure sensitive adhesive article of claim 15 wherein an adhesive tape sample comprising a backing and the pressure sensitive adhesive composition disposed thereon has a low stress peel adhesion value from stainless steel of at least about 300 minutes.

24. The pressure sensitive adhesive article of claim 15 wherein the substrate is selected from the group of cloth, metallized foil, metallized film, polymeric film, nonwoven polymeric material, paper, foam, and combinations thereof.

25. The pressure sensitive adhesive composition of claim 1 wherein the thermoplastic elastomer-based pressure sensitive adhesive component further comprising a tackifying agent.

* * * * *

UNITED STATES PATENT AND TRADEMARK OFFICE
CERTIFICATE OF CORRECTION

PATENT NO.   : 6,503,621 B1
DATED        : January 7, 2003
INVENTOR(S)  : Ma, Jingjing It is certified that error appears in the above-identified patent and that said Letters Patent is hereby corrected as shown below:

Column 2,
Line 5, "WO 95/25469" should be -- WO 96/25469 --

Column 6,
Line 2, "(Keller et al.)" should be -- (Kellen et al.) --

Column 10,
Line 5, "Removability After Temperature Aging rolled" should read
-- Removability After Temperature Aging
    Removability of the PSA tape from a painted (acrylic type paint) cold rolled --

Signed and Sealed this

Tenth Day of February, 2004

JON W. DUDAS
*Acting Director of the United States Patent and Trademark Office*